Feb. 15, 1966   W. P. KUSHMUK ETAL   3,234,693
BRAKESHOE GRINDER CLAMP
Filed June 11, 1963   3 Sheets-Sheet 1
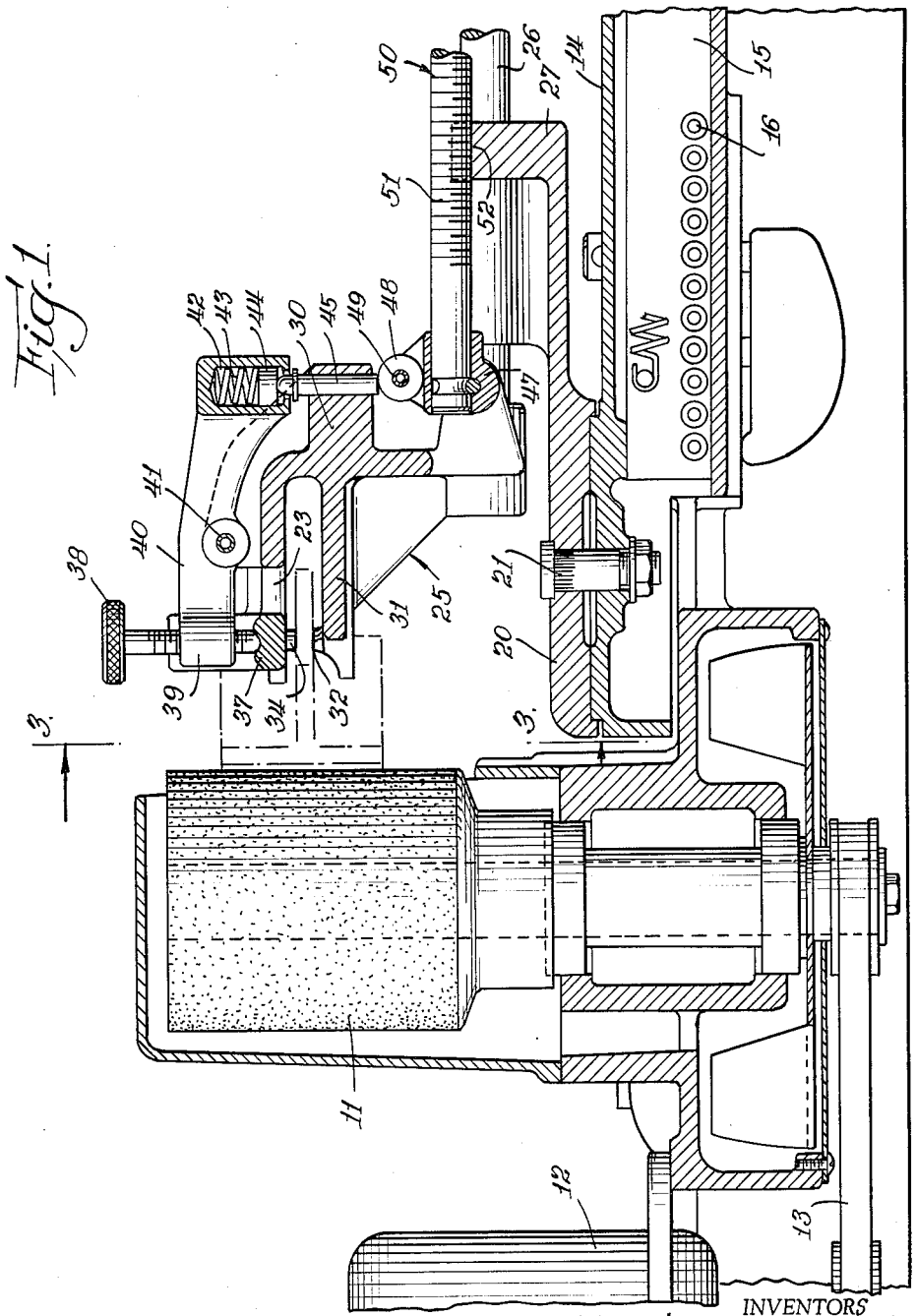
INVENTORS
Walter P. Kushmuk
and Leo C. Bogaerts
BY Fidler, Beardsley, Bradley,
Patnaude & Petherbridge Att'ys.

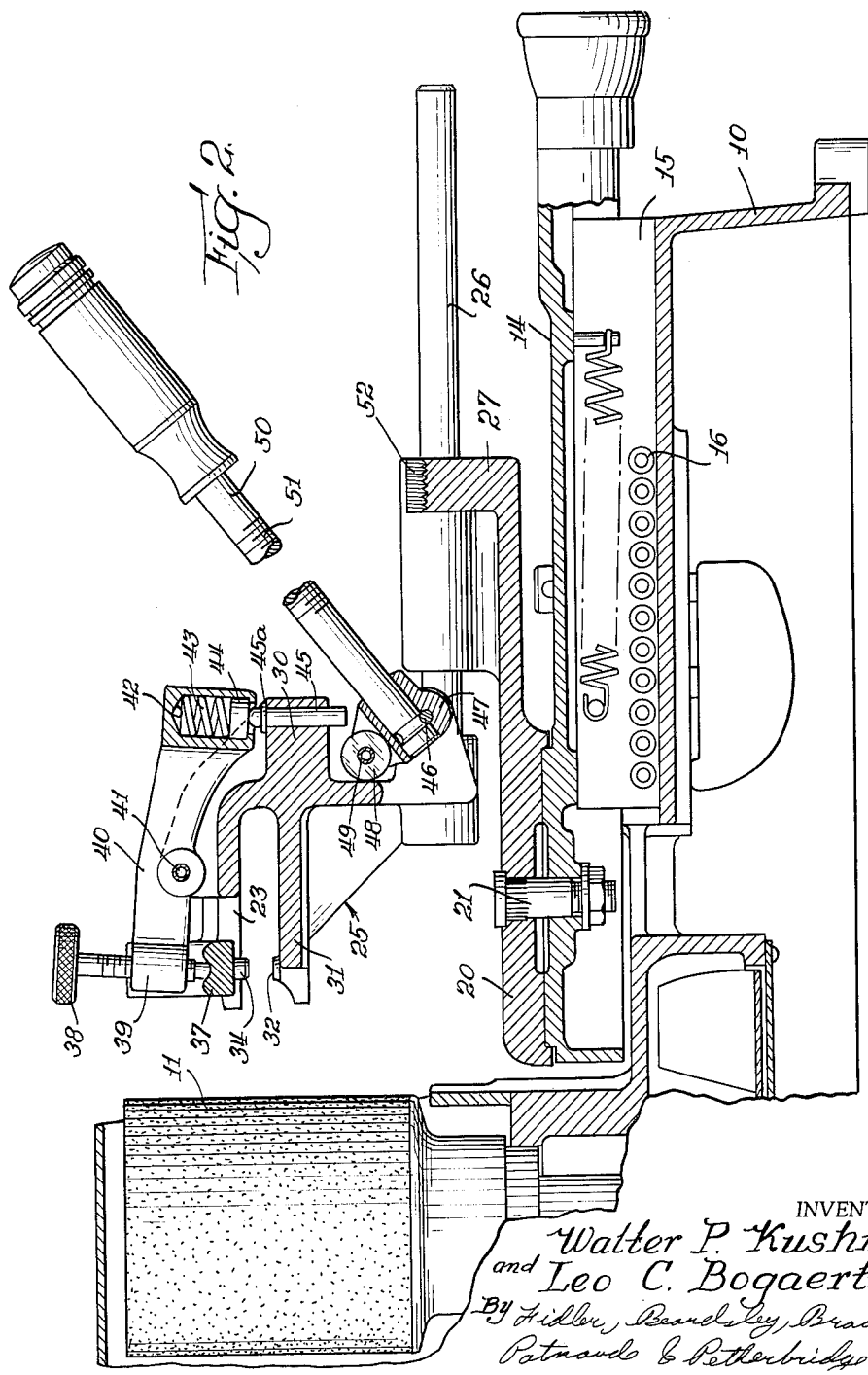

Feb. 15, 1966     W. P. KUSHMUK ETAL     3,234,693
BRAKESHOE GRINDER CLAMP
Filed June 11, 1963     3 Sheets-Sheet 3
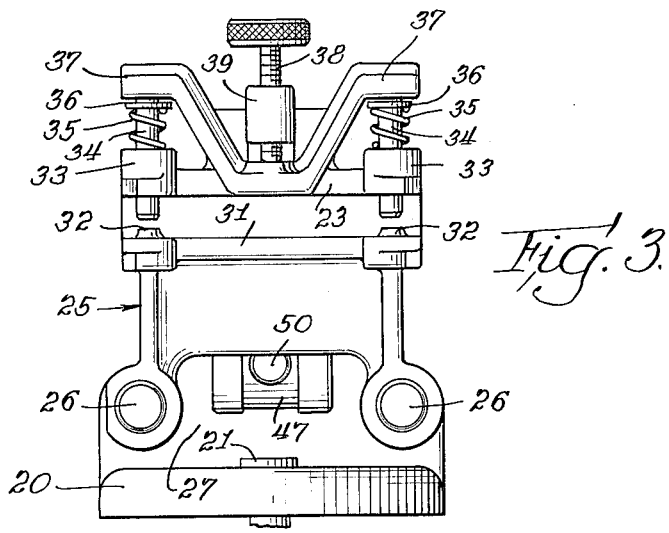
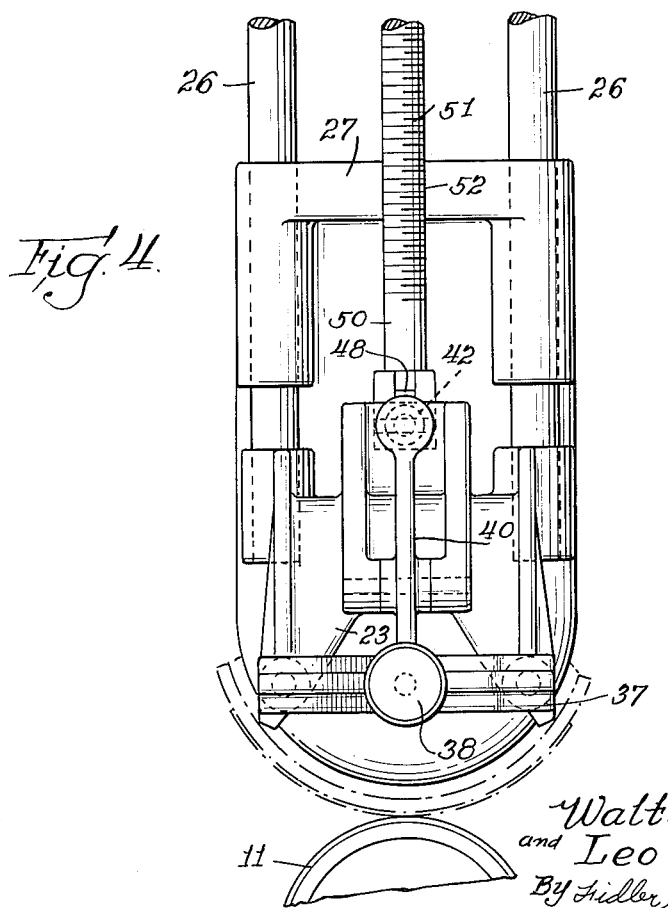
INVENTORS
Walter P. Kushmuk
and Leo C. Bogaerts.

United States Patent Office 3,234,693
Patented Feb. 15, 1966

3,234,693
BRAKESHOE GRINDER CLAMP
Walter P. Kushmuk, Niles, and Leo C. Bogaerts, Antioch, Ill., assignors to Ammco Tools, Inc., North Chicago, Ill., a corporation of Illinois
Filed June 11, 1963, Ser. No. 287,134
4 Claims. (Cl. 51—96)

This invention relates to grinders and has to do more particularly with a novel workpiece clamp and means for operating the clamp.

The clamp of the present invention is particularly well adapted for use in a grinder of the type shown in United States Letters Patent to Billeter, No. 2,715,799. Such devices are particularly well adapted for grinding automotive brake shoes although they are not thus limited. In the device of the Billeter patent, the workpiece clamp is carried on a turntable in such manner that the clamp can be advanced toward or away from a grinding element or can be rocked about a pivot so that all portions of the arcuate surface of the workpiece are brought into contact with the grinding element. In order to provide for the feed of the workpiece toward or away from the grinder and swinging movement relatively thereto, the holder is mounted on a turntable pivoted about an axis parallel to that of the grinding element. An operating rod is connected to the workpiece clamp and is adapted to be rocked about a horizontal axis so that it can be moved into engagement with a half-nut on the turntable whereby turning of the operating rod advances the clamp toward the grinding element or retracts the clamp. The operating rod can be rocked out of engagement with the half-nut to permit rapid feed of the clamp by the operating rod.

In the prior art devices of the character to which the present invention relates, there is provided a fixed clamping member and a movable clamping member adapted to be moved toward the fixed clamping member by manipulation of a screw to clamp the workpiece. Thus, these devices require two separate operations to condition the clamp for the grinding action. First, the workpiece must be inserted in the clamp and the clamp manipulated to clamp the workpiece therein. Next, the operating rod must be moved down into engagement with the half-nut for the feeding operation.

In accordance with the present invention, the movable clamping member is actuated by the operating rod and it is not necessary to manipulate a separate screw to clamp the workpiece. Thus the clamp may be opened or closed by the same operation as that of moving the operating rod out of or into position in the half-nut.

An object of the present invention is to provide a new and improved workpiece clamp for a grinder.

Another object is to provide a workpiece clamp for a grinder of the type wherein there is provided an operating rod for moving the clamp toward or away from the grinding element and wherein the movable clamping element of the clamp is actuated by manipulation of the operating rod.

Other objects and advantages of the invention will be apparent from the following description taken in connection with the drawings wherein:

FIG. 1 is a vertical, sectional view through a grinder embodying the present invention with the clamp being shown in clamping position;

FIG. 2 is a view similar to FIG. 1 only showing the clamp in open position;

FIG. 3 is a view of a section taken along line 3—3 of FIG. 1; and

FIG. 4 is a top plan view of the clamp.

The grinder comprises a base 10 on which is rotatably mounted a grinding wheel 11 driven by a motor 12 through a belt drive 13.

The base 10 also supports a slide 14 slidable on the base 10 toward and away from the grinding element 11. The slide is positioned by an indexing bar 15 which is in turn positioned by an indexing pin (not shown) cooperating with sockets 16 generally in the manner disclosed in the aforesaid Billeter patent.

A turntable 20 is mounted by a pivot pin 21 on the slide 14 for rocking movement with respect to the slide 14 about an axis parallel to the axis of the grinder element 11.

A workpiece holder or clamp 25 is supported on the turntable by a pair of rods 26 which extend through an upstanding portion 27 of the turntable and thereby support the clamp 25 for movement on the turntable 20 toward and away from the grinding element 11. The clamp includes a main body 30 having a fixed lower clamping jaw 31 provided with bosses or pads 32. Overlying the lower jaw 31 is a fixed upper jaw 33 which carries a pair of clamping pins 34. Each of the clamping pins extends slidably through the upper jaw 33 and is urged upwardly by a spring 35 seated against a retaining ring 36. A vertically adjustable member 37 is provided which rests on the upper ends of the pins 34 and is positioned by a screw 38 extending through a journal portion 39 in a clamping lever 40 to position the pins 34 relatively to the jaw 33. The clamping lever 40 is pivotally mounted by a pivot 41 fixed to the upper clamping jaw 33.

At its other end, the lever 40 is formed with a recess 42 in which is located a coil spring 43 and a spring follower 44. Slidable in the body 30 is a pin 45 bearing against the follower. The pin 45 is maintained in the member 30 by a C-ring 45a.

An operating rod 50 is pivotally carried on the clamp body 30 by a pin 46 passing through a socket member 47 and the clamp body 30. The socket member 47 carries a roller 48 rotatably mounted thereon by a pivot pin 49. The operating rod 50 is threaded throughout a portion of its length and the turntable has a half-nut 52 for receiving the threaded portion 51 of the operating rod 50 when the latter is in the position shown in FIG. 1.

When the operating rod 50 is in the position shown in FIG. 2 wherein it is disengaged from the half-nut, the clamp 25 can be rapidly moved toward or away from the grinding element 11. On the other hand, when the operating rod is rocked downwardly into the position shown in FIG. 1, the clamp can only be advanced or retracted by turning the operating rod. Thus a slow feed is provided.

When the operating rod is in its upper position, as shown in FIG. 2, the lever 40 is rocked to a position to move the pins 34 away from the pads 32 and thus the jaw is opened for the reception of a workpiece such as a brake shoe. When the operating rod 50 is moved downwardly to the position shown in FIG. 1, the roller 48 passes under and in engagement with the pin 45 to urge the lever 40 in a counterclockwise direction and move the pins 34 into clamping engagement with the workpiece as shown in FIG. 1. This is in the nature of a camming action. When the operating rod is in its horizontal position, shown in FIG. 1, the roller 48 is positioned slightly to the right as seen in FIG. 1 relative to the pin 45 and thus provides a locking action which locks the lever in this counterclockwise position.

We claim:
1. In a grinder of the type including a base, a grinding element supported on said base, a carriage slidable on said base toward and away from said grinding element, a turntable pivotally carried on said carriage, a workpiece holder clamp slidable on said turntable, a half-nut carried by said turntable, a feed arm having a threaded portion and means pivotally connecting said feed arm to said clamp for swinging movement between a first position threadedly engaging said half-nut and a second position disengaged from said half-nut, the improvement wherein said workpiece holder clamp includes a body having upper and lower fixed portions, a pair of clamping pins slidable in said upper portion for clamping a workpiece against said lower portion, spring means urging said pins upwardly, a member supported on the tops of said pins, a lever pivotally supported on said body and engageable at a first end with said member, a push rod mounted in said body and engaging the second end of said lever and camming means carried by said feed arm for coacting with said push rod moving the second end of said lever upwardly when said feed arm is moved into position engaging said half-nut.

2. A grinder as claimed in claim 1 wherein said camming means comprises a roller which coacts with said push rod to lock the second end of said lever in an upward position when said feed arm is in a horizontal position.

3. A grinder as claimed in claim 1 wherein said lever has an adjusting screw threadedly mounted in one end and a spring recessed in the other end, said adjusting screw cooperating with said member to determine the projection of said slidable pins below said upper fixed portion when said clamp is in an open position.

4. In a grinder of the type including a base, a grinding element supported on said base, a carriage slidable on said base toward and away from said grinding element, a turntable pivotally carried on said carriage, a workpiece holder clamp slidable on said turntable, a half-nut carried by said turntable, a feed arm having a threaded portion and means pivotally connecting said feed arm to said clamp for swinging movement between a first position threadedly engaging said half-nut and a second position disengaged from said half-nut, the improvement wherein said workpiece holder clamp includes a body having a fixed jaw and a jaw movable toward and away from a clamping position relative to said fixed jaw, lever means for moving said movable jaw, plunger means reciprocably mounted in said body for moving said lever means, and camming means on said feed arm which co-acts with said plunger means to move said lever means for moving said movable jaw into clamping position when said feed arm is moved into position engaging said half-nut and out of clamping position when said feed arm is disengaged from said half-nut said plunger and camming means locking said movable jaw relative to said fixed jaw when said feed arm engages said half-nut.

References Cited by the Examiner
UNITED STATES PATENTS

| | | | |
|---|---|---|---|
| 63,929 | 4/1867 | Morse | 269—238 X |
| 2,021,243 | 11/1935 | Rutter | 51—217 |
| 2,467,600 | 4/1949 | Shipley | 269—224 X |
| 2,619,138 | 11/1952 | Marler | 269—238 X |
| 3,060,644 | 10/1962 | Wisti | 51—96 |

LESTER M. SWINGLE, *Primary Examiner.*